Patented Apr. 26, 1938

2,115,197

UNITED STATES PATENT OFFICE 2,115,197

ABRASIVE, POLISHING, AND LIKE MATERIALS

Robert Seaver Edwards, Milton, Mass., assignor to Rumford Chemical Works, Rumford, R. I., a corporation of Rhode Island No Drawing. Application August 23, 1937, Serial No. 160,524

9 Claims. (Cl. 51—280)

The production of abrasives or materials of non-scratching character has long been attempted but without practical satisfaction of the needs of various operations.

Without intention of limitation by such basis of discussion I may offer as an explanation of my materials in their applicability as in abrasive use, although they also have other uses and may be produced in many forms and in various combinations.

In order to make my materials and uses clear I will illustrate by reference to one of its characteristic features which is its grain or crystal structure. In this aspect the material has capacity for physically very fine, but definite material formed by the action of my method of producing the resultant new products. Such crystalline material has the inherent property or characteristic of relative toughness or resistance to break down under pressure in use as for example under a polishing lap or wheel without scratching a fine surface.

Such properties are of great importance as in the polishing of very smooth surfaces such as alloys or polished metal surfaces.

The polishing of optically dimensioned glass for an extreme example ordinarily is done with cloth or pitch-polishing with rouge or like mild abrasive. In the instance of polishing a lens which has been molded as a vitreous ingot and rough ground, the final or nearly final surface treatment was formerly a very careful polishing out of microscopic ridges or scratches with rouge or like mineral material.

Ordinary rouges are a natural emery and in some forms or grades are known as jeweler's rouge. They are ferric oxides and have to be inspected carefully for impurities which might cause scratches on the preliminary polish already carefully developed, as on the lens surface as it has been given optical figure. The same is true of high finish on metal surfaces as of alloy or plate.

True emerys or corundums are too harsh and cannot safely be used for such polishing operation. As far as I am advised nature apparently omitted to provide, and man so far has failed to discover and use, mineral abrasive of a substantial hardness or toughness or resistance to break down, but of non-scratching character. Considered from that viewpoint my materials might be considered as artificial mineral of novel, and for the purposes contemplated, improved characteristics.

The matter of scratch in relation to minerals, especially in testing for streak has of course long been known. In natural minerals the relation of hardness or power to scratch to softness or ability to be scratched or relatively not to scratch, has long been the common working basis of study and analysis.

My concept while apparently ambitious is really simple. I propose to produce artificial mineral material products adapted to polishing and many other uses having the natural characteristic softness of its natural group but with a developed unnatural hardness of other types of mineral classes or even harder. Gypsum crystals, for example, have a hardness of 2, as calcite, fluorspar or even higher in Mohr's scale. Quartz is recognized as of a hardness of 7.

Among the other physical characteristics studied and noted by mineralogists is that of specific heat. The specific heat and melting point of minerals are essential characters and capable of exact measurements, but they apparently have not been used in developing this type of abrasive.

Different minerals differ widely in their "fusibility" and a scale was proposed by Von Kobell. By way of this comparison this is usually given as the usual list.

(1) Stibnite _____ (525° C.)
(2) Natrolite _____ (965° C.)
(3) Almandine_____ (1265° C.)
(4) Actinolite_____ (1296° C.)
(5) Orthoclase _____ (1175° C.)
(6) Bronzite_____ (1300° C.)
(7) Quartz_____ (1430° C.)

Thus while specific heat, as well as hardness, has been exhaustively studied no one apparently has conceived of the possibility of utilizing such factors in the commercial production of polishing and like materials.

In my studies of certain silicates in connection with gypsum manufactured products, I discovered certain peculiar changes at definite temperatures. These I studied in acordance with the variant effects with which I was familiar, notably through the presence of impurities in the sources.

In one of my earlier patents I described the control and utilization to advantage of what had been deleterious impurities in the source whether natural or artificial. Under my present concept I utilize certain known factors as of softness, specific heat and other known and by my invention controllable factors of the source.

Of these certain matters of temperature during calcination had been carefully studied and in the manufacture of cement materials I have set up certain temperature ranges as critical. Such assigned temperatures for the different degrees of calcination were workable as far as the industry or art had progressed.

I have found that the old so-called inversion temperature while a necessary thing to know and to watch had not been constructively understood.

Care in determining and guarding the temperature at which "inversion" takes place was usually a negative consideration without certain specific chemical treatment of the gypsum prior to calcination.

These aspects are disclosed in my Patent No. 2,090,625 and which patent and its disclosures are made a part hereof by reference and by adoption in such parts as may be found advisable or necessary to give well rounded disclosure herein.

It is of course to be understood that in said patent my material is primarily discussed from its cementitious aspect. The relation of the individual grain produced by the method therein and selected as herein suggested for its abrasive properties, were conceived of by me as the same or of related properties to those in the set gypsum cement, comparative tests of which I disclosed and discussed at length in said patent, my concept being that the individual crystals or crystalline grains as discrete particles when used as abrasives would prove to have that resistance to fracture or break-down which appeared so characteristically in the set cement which I have so exhaustively tested. While the strength in the set cement and its resistance to compression and strain under high pressures appeared to me to make my material available with like characteristics in free grains in an abrasive, and tests of my materials separated and graded for abrasive purposes have proved this to be the case. My material, therefore, constitutes a new mineral abrasive having new and distinct characteristics and qualities. As an abrasive it may be separated from my fine ground product as by air separation to a fineness of micron dimension. In such form it is capable of being used in water or other suspensions and can be used as impregnation for cloth, paper or other polishing material and can be used in pastes as in rouges for polishing lenses, metals and other optical surfaces. By gradations of such finer forms, it may be produced in sizes adapted for coarser abrasives and can be used in manufacturing papers and cloths, as well as discs and wheels. In the latter use its cementitious characteristics dwelt upon at length in my patent become interestingly available as in bonding with itself or with a like bond to form wheels, discs or other forms or shapes to be used in polishing, grinding or turning. Due also to its possible production in extremely fine form it has use even in dental preparations and articles for cleaning and polishing either by personal or professional application.

Considered as a novel crystalline product it may be helpful in placing it in the art to consider it as if it were an artificial or synthetic mineral of characteristics new to material crystallography. Without wishing to be limited by any theoretical speculations I may discuss it in relation to two common mineral sources. These are cited merely as illustrative and will be understood without undue detail of mineralogical reference by those familiar with their variant chemical formulae and physical characteristics.

Considering first the gypsum type, this is rated as very soft and has a corresponding low tendency to scratch. My invention contemplates raising the hardness of a gypsum source under such conditions that my resultant abrasive is of increased resistance to break down, ordinarily considered as hardness in the sense of scratch, and at the same time increasing the inherent density of the gypsum source as evidenced by the specific gravity of the finished product.

Another example near the opposite end of the hardness scale is quartz. As the available sands as sources are high in this silicate, as well as in feldspar, I contemplate a modification of such common mineral sources. In these I am able to raise effective hardness or resistance to break down without depending on crystal formations of higher scratching tendency.

What I therefore claim and desire to secure by Letters Patent is:—

1. An abrasive or the like consisting of fine substantially uniform grains of gypsum material containing phosphoric acid and an alkaline phosphate in an amount sufficient to act as an inhibitor of anhydrite recrystallization to preclude dissociation of the anhydrite when the same is calcined at temperatures between 1800° F. and 2300° F.

2. An abrasive or the like consisting of fine substantially uniform grains of a calcined gypsum material, comprising anhydrous calcium sulphate reacted with phosphoric acid, an alkaline phosphate and silica in an amount sufficient to substantially inhibit anhydrite recrystallization and dissociation when the mixture is heated at temperatures between 1800° F. and 2300° F.

3. An abrasive or the like consisting of crystalline grains of a pulverulent gypsum and calcined with an amount of phosphoric acid, an alkaline phosphate and silica sufficient to substantially eliminate anhydrite recrystallization and dissociation when the mass is heated to temperatures between 1800° F. and 2300° F. in admixture with a catalyst.

4. An abrasive or the like consisting of fine crystalline grains of a calcined gypsum material, comprising anhydrous calcium sulphate reacted with phosphoric acid and an alkaline phosphate in an amount sufficient to substantially inhibit anhydrite recrystallization and dissociation when the mixture is heated at temperatures between 1800° F. and 2300° F.

5. As a new product of manufacture, a synthetic polishing or like material consisting of fine tough crystals of calcined calcium sulphate of controlled dissociation, said crystals having a relatively higher resistance to break down than the surfaces of objects to be worked on, which surfaces are of resistant hardness higher than that of gypsum but reductably affected by mechanical attritive processing without scratch of the material of such surfaces in progress of manipulative treatment.

6. As a new product of manufacture, a synthetic abrasive or like material consisting of fine tough crystals of an artificially modified silicate source containing quartz and of increased resistance to break down by pressure and of controlled dissociative development, said crystals being of substantially uniform particle size of the order of micron dimension and of effective abrasive action without scratching tendency.

7. As a new product of manufacture, a synthetic abrasive or like material consisting of fine tough crystals of an artificially modified silicate source containing quartz and of increased resistance to break down by pressure and of controlled dissociative development by calcination at high temperature in the presence of reactive combinative factors and resultantly including silicate of alumina as in combination with a higher phosphate salt of silica, said crystals being of substantially uniform particle size of the order of micron dimension and of effective abrasive action without scratching tendency.

8. As a new product of manufacture, a synthetic abrasive or like material consisting of fine tough crystals of an artificial silicate highly resistant to break down by pressure and of controlled dissociative development and including that of a double silicate of alumina and phosphoric acid, said crystals being of substantially uniform particle size of the order of micron dimension and of effective abrasive action without scratching tendency.

9. As a new product of manufacture, a synthetic abrasive or like material consisting of fine tough crystals of an artificial silicate highly resistant to break down by pressure and of controlled dissociative development by calcination at high temperature in the presence of reactive combinative factors and resultantly including that of a double silicate of alumina and sil-a-sil metaphosphate, said crystals being of substantially uniform particle size of the order of micron dimension and of effective abrasive action without scratching tendency.

ROBERT SEAVER EDWARDS.